US012443923B2

(12) United States Patent
Telahun

(10) Patent No.: US 12,443,923 B2
(45) Date of Patent: Oct. 14, 2025

(54) SYSTEMS, METHODS, AND COMPUTER PROGRAM PRODUCT FOR MANAGING A NETWORK OF CONNECTIONS IN A RECRUITING ENVIRONMENT

(71) Applicant: Goitom Telahun, Atlanta, GA (US)

(72) Inventor: Goitom Telahun, Atlanta, GA (US)

( * ) Notice: Subject to any disclaimer, the term of this patent is extended or adjusted under 35 U.S.C. 154(b) by 212 days.

(21) Appl. No.: 17/873,400

(22) Filed: Jul. 26, 2022

(65) Prior Publication Data

US 2024/0037507 A1  Feb. 1, 2024

(51) Int. Cl.
*G06Q 10/1053*  (2023.01)
*G06Q 10/1093*  (2023.01)

(52) U.S. Cl.
CPC ..... *G06Q 10/1053* (2013.01); *G06Q 10/1095* (2013.01)

(58) Field of Classification Search
CPC .............. G06Q 10/1053; G06Q 10/1095
See application file for complete search history.

(56) References Cited

U.S. PATENT DOCUMENTS

| 6,070,143 | A | 5/2000 | Barney et al. | |
| 8,429,149 | B2 | 4/2013 | Toomey et al. | |
| 2002/0128892 | A1* | 9/2002 | Farenden | G06Q 10/10 |
| | | | | 705/7.14 |
| 2004/0236598 | A1 | 11/2004 | Thomsen | |
| 2005/0240431 | A1* | 10/2005 | Cotter | G06Q 30/02 |
| | | | | 705/321 |
| 2006/0080128 | A1 | 4/2006 | Brown et al. | |
| 2008/0071746 | A1 | 3/2008 | Concordia et al. | |
| 2008/0208907 | A1* | 8/2008 | Tolve | G06Q 10/06 |
| 2010/0262552 | A1 | 10/2010 | Pulnikova | |
| 2012/0265770 | A1* | 10/2012 | Desjardins | G06Q 10/06 |
| | | | | 707/748 |
| 2013/0024105 | A1* | 1/2013 | Thomas | H04W 4/023 |
| | | | | 701/410 |

(Continued)

OTHER PUBLICATIONS

Rahman, Md Mijanur, Md Sharif Uddin Siddiqe, and Aftab Uddin. "Headhunting System Using Blockchain Technology." 2022 International Congress on Human-Computer Interaction, Optimization and Robotic Applications (HORA). IEEE, 2022. (Year: 2022).*

(Continued)

*Primary Examiner* — Corey Russ
(74) *Attorney, Agent, or Firm* — Moore & Van Allen PLLC; Gabrielle M. Carlini

(57) ABSTRACT

Methods, apparatuses, and computer program products are provided to detect candidate activity, perform a query to determine at least one job opening associated with a desired level of competency that is satisfied by a level of competency associated with the candidate, transmit a message comprising the at least one job opening to the candidate, receive an indication that the candidate reviewed the at least one job opening, in response to the indication, create a prospective candidate object to represent the candidate, wherein the prospective candidate object is associated with the at least one job opening, and monitor the prospective candidate object for progress made by the candidate in applying for the at least one job opening. The methods, apparatuses, and computer program products may also facilitate recruiter-side actions and tasks.

18 Claims, 21 Drawing Sheets

(56) References Cited

U.S. PATENT DOCUMENTS

| | | | |
|---|---|---|---|
| 2013/0036066 A1 | 2/2013 | Telahun | |
| 2013/0066795 A1* | 3/2013 | Katz | G06Q 10/1053 705/321 |
| 2014/0317009 A1* | 10/2014 | Bilodeau | G06Q 10/1053 705/321 |
| 2015/0186847 A1* | 7/2015 | Menon | G06Q 10/1053 705/321 |
| 2015/0248649 A1* | 9/2015 | Avats | G06Q 10/1053 705/321 |
| 2015/0289100 A1* | 10/2015 | Stringer, II | H04W 4/021 455/456.3 |
| 2016/0275439 A1* | 9/2016 | Avats | C04B 38/0009 |
| 2018/0060823 A1* | 3/2018 | Garimella | G06Q 10/1053 |
| 2019/0188648 A1* | 6/2019 | Ruiz | G06Q 10/1053 |
| 2019/0251517 A1* | 8/2019 | Champaneria | G06Q 10/1095 |
| 2019/0318186 A1* | 10/2019 | Sergott | G06Q 10/063114 |
| 2020/0065771 A1* | 2/2020 | Gaspar | G06Q 10/1053 |
| 2021/0304152 A1* | 9/2021 | Ruiz | H04W 4/023 |
| 2022/0335386 A1* | 10/2022 | Hood | G06Q 10/1053 |
| 2022/0343285 A1* | 10/2022 | Deuchar | G06Q 10/105 |
| 2023/0196295 A1* | 6/2023 | Bixler | G06Q 10/1053 705/321 |
| 2023/0306328 A1* | 9/2023 | Court | G06F 3/04817 |

OTHER PUBLICATIONS

Related U.S. Appl. No. 12/731,493, filed Mar. 25, 2010, titled Systems and Methods for Online Career Content and Networking, now abandoned, 25 pages.

U.S. Appl. No. 61/164,243, filed Mar. 27, 2009, titled Systems and Methods for Online Career Content and Networking, now expired, 43 pages.

* cited by examiner

Fair Connect Menu Options ～301

302 Scan
304 Career Fair Map
306 Search
308 My Schedule
310 My Work Box
312 Messages
314 My Profile
316 Capien

My Work Box — 501

Job Level: Manager  ▶ 530   Share ☒ 532   Hide/Show Hired Candidates 528

| 502 Job # | 504 Position | 506 First Name | 508 Last Name | 510 Candidate # | 512 Experience Level | 514 Initiate | 516 Engaged | 520 Document Review | 522 Expanded View | Full View | Interview | Portfolio DocuSign | Background Check | Credit Check | DocuSign Offer | 521 Hired |
|---|---|---|---|---|---|---|---|---|---|---|---|---|---|---|---|---|
| XEJ545 | Customer Service Manager | Bob | Laney | 33423950 ○ | Q | C | | ○ | | | | | | | | |
| JNR394 | Training Manager | Amy | Spoon | 41223884 ● | A | R | ❶ | | | | | | | | | |
| BJN034 | Training Manager | Cary | Capri | 52223451 ○ | T | C | ◀ | | | | | | | | | |
| 783NDR | Metrics Manager | Michael | Fritz | 89023977 ○ | T | C | ○ | | ✦ | ✦ | | | | | | |
| 526 | | | | | | | | | | | | | | | | |
| GEJ546 | HR Manager | Joe | Nicely | 74223954 ● | Q | C | ○ | ○ | | | | ○ | ○ | ○ | ○ | ○ |
| JTC992 | Operations Manager | Judy | Green | 89995400 ● | V | R | ○ | ○ | | | | ○ | ○ | ○ | ○ | ○ |

My Work Box

601 — Job Status: Pending ▶ 620

618 Hide/Show Job Offers

| Job # | Position | 602 Company | 604 Recruiter | 606 Resume Submitted | 608 Interview Date | 610 Application Status | 612 Job Offer |
|---|---|---|---|---|---|---|---|
| XEJ545 | Customer Service Manager | Carrot Inc. | John Doe (704)444-1414 ● | ✳ | ⊘ | Pending – Background Check | ▲ |
| JNR394 | Training Manager | Computers R Us | Lee Lewis (704)802-0099 ● | ✳ | 04/04/2017 | Pending – Interview Scheduled | ▲ |
| BJNQ34 | Training Manager | Kitchen and Things | Sydney South (704)456-3456 ● | ✳ | 04/06/2017 | Pending – Interview Scheduled | ▲ |
| 783NDR | Metrics Manager | Charlotte Comics | Lee Nothern (704)127-7898 ● | ✳ | ⊘ | Pending – Application Recieved | ▲ |

614

| GEJ546 | HR Manager | Artemis | Kacey Green (704)809-7745 ● | ⊘ | ⊘ | ⊘ | ⊘ |
| JTC992 | Operations Manager | Trente Cinq | Don Swift (704)334-5545 ○ | ⊘ | ⊘ | ⊘ | ⊘ |

Find your place in the world!
Capien

| Universe | View workbox | Inmail | Reports |

My Work Box > Job Description

[Back to Jobs Tray] [Add to Palette]

[Go to Candidate John Doe]

How it works

[Print Current View]  ◈ Hide/Show job

[John Doe]
[Recruiter Mary]
✕ Remove from Palette

Start Date  08/16/2014
End Date    08/16/2014

Job #:           JBN394
Posted on:       12-04-2014
Last modified:   12-04-2014

My other postings

Job Description

Part A

⊖ Key Terminologies

⊖ Overall duty and job functions

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur.

Sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo. Nemo enim ipsam voluptatem quia voluptas sit aspernatur aut odit aut fugit, sed quia consequuntur magni dolores eos qui ratione voluptatem sequi nesciunt.

⊕ Overall duty and job functions

⊕ People skills

⊖ Development Growth

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur.

FIG. 11

[Universe] [Network] [View workbox] [Palette] [Inmail] [Reports]

[Go to Recruiter Mary]

John Doe

Customer Service Representative

Level 3

Experience
- ○ Acquired — Have direct experience, no learning curve
- ● Qualified — Skilled to be successful, with learning curve
- ○ Targeted — Would like to develop skills, open for challenge

Status
- ○ Active — Presently looking for opportunity
- ○ Passive — Employer contact welcome
- ● Inactive — Unlikely to pursue

[Cancel and go back]  [Submit]

Please note: When you add positions to your palette, you become visible to recruiters in that room.

FIG. 12

Find your place in the world!
Capien

| Universe | Network | View workbox | Palette | Inmail | Reports | | Go to Recruiter Mary | How it works | John Doe |

Tray > Room > Palette

Customized Resume

| Customized Resume | Room # | Job Title | Experience | Status | Delete | Pull | Auto Apply | Jobs |
|---|---|---|---|---|---|---|---|---|
| John's Resume | 2928387 | Training Representative | Acquired ▶ | Active ▶ | ☐ | ● | Yes | View |
| John's Resume 2 | 3940592 | Training Supervisor | Qualified ▶ | Inactive ▶ | ☐ | ● | No | View |
| Attach Resume | 3940592 | Training Director | Qualified ▶ | Inactive ▶ | ☐ | ● | Yes | *View* |
| Exec Resume | 4859603 | Training Director | Acquired ▶ | Active ▶ | ☐ | ● | No | View |

Click on One of the Rooms Above to View Open Jobs and Apply.

What do you want to do? [ Save ]

[ Go Back to Tray ]

Please note: When you add positions to your palette, you become visible to recruiters in that room.

JUMP TO AA

FIG. 13

Find your place in the world!
Capien     Go to Recruiter Mary     How it works   John Doe

| Universe | Network | View workbox | Palette | Inmail | Reports |

Tray
> Room

Employers in Atlanta looking for Representative.

| Acquired | Qualified | Targeted |

| Employer | Industry | Company Size | Age of Company | Job Number | Job Title | Span | Reports To | Interest | Apply |
|---|---|---|---|---|---|---|---|---|---|
| Best Buy | Electronics | 5000 | 56 | XG2345 | Care Agent | 0 | Supervisor | Invisible ▶ | ☑ |
| Xfinity | Media | 5400 | 20 | HJ4567 | Customer Rep. | 0 | Manager | 3 ▶ | ☐ |
| Costco | Distribution | 7200 | 50 | HY3452 | Phone Agent | 0 | Manager | 3 ▶ | ☐ |
| Delta | Airline | 12000 | 80 | YT4598 | Travel Advisor | 0 | Supervisor | 2 ▶ | ☑ |
| ~~Liberty~~ | ~~Media~~ | ~~4500~~ | ~~15~~ | ~~489999~~ | ~~Sales Rep.~~ | 0 | ~~Team Lead~~ | 1 ▶ | Applied To |
| GE | Aviation | 300000 | 150 | 213400 | Client Rep. | 0 | Senior Rep. | Invisible ▶ | ☑ |
| GE | Healthcare | 300000 | 150 | HJ3412 | Client Advocate | 0 | Manager | 2 ▶ | ☑ |

Submission Successful     Submit

John Doe

SYSTEMS, METHODS, AND COMPUTER PROGRAM PRODUCT FOR MANAGING A NETWORK OF CONNECTIONS IN A RECRUITING ENVIRONMENT

TECHNOLOGICAL FIELD

Example embodiments of the present invention relate generally to computer technology and, more particularly, relate to methods, apparatuses, and computer program products for managing interactions between candidates seeking jobs and recruiters seeking to fill job openings with eligible candidates, and providing a step-by-step workflow of the job opening fulfillment process.

BACKGROUND

Recruiting the best candidates for employment in a recruiting environment such as a career fair can be tricky and overwhelming to navigate through. There could be hundreds of booths representing companies from a wide range of businesses and industries. This can make it difficult for job seekers to target which companies are worth approaching and which ones they'll likely have nothing in common with. Among the companies are recruiters who are eager to find the best candidate to fill their job openings. The increasing volume of job seekers at these career fairs make it difficult for recruiters to find qualified candidates. Companies spend a lot of time and expense to exhibit at careers fairs with the purpose of meeting as many potential candidates as possible. Likewise, candidates try to make the most of their time by speaking with as many recruiters as scheduling permits. This limits the time both the recruiters and candidates have to really learn about each other. Additionally, it can be difficult for candidates to find jobs for which they are qualified that are consistent with their career goals. Furthermore, once a recruiter finds a suitable candidate for a job opening, it can turn into quite an effort to manage all the tasks involved with scheduling interviews, organizing and distributing resumes, evaluating the candidate and extending an employment offer in an efficient manner. Also, it is often difficult for a recruiter to keep track of all these tasks. Therefore, a need exists to enhance the efficiency of recruiting and hiring candidates. In addition, another need exists to develop an efficient, streamlined system to manage tasks associated with evaluating and hiring candidates.

At the same time, the inventor has discovered other latent and unmet needs stemming from the nature of the recruiting environment and employment application process, which has not materially changed in many years. The traditional recruiting environment, such as a career fair or conference, involves thousands of people, long lines, and more often than not, disappointment after waiting in a long line to find out there are no job openings in the areas a candidate is qualified for or no candidates eligible for the job position. The traditional application process can involve many tasks and, if improperly managed, often leads to delays in offering a job to a highly skilled candidate in a very competitive job market. However, the inventor has identified mechanisms that improve navigating through a career fair and the application process.

BRIEF SUMMARY

In accordance with one aspect, a method is provided. In one embodiment, the method comprises detecting candidate activity, performing a query to determine at least one job opening associated with a desired level of competency that is satisfied by a level of competency associated with the candidate, transmitting a message comprising the at least one job opening to the candidate, receiving an indication that the candidate reviewed the at least one job opening, in response to the indication, creating a prospective candidate object to represent the candidate, wherein the prospective candidate object is associated with the at least one job opening, and monitoring the prospective candidate object for progress made by the candidate in applying for the at least one job opening.

In accordance with another aspect, a computer program product is provided. The computer program product may comprise at least one computer-readable storage medium having computer-readable program code portions stored therein, the computer-readable program code portions comprising executable portions configured to detect candidate activity, perform a query to determine at least one job opening associated with a desired level of competency that is satisfied by a level of competency associated with the candidate, transmit a message comprising the at least one job opening to the candidate, receive an indication that the candidate reviewed the at least one job opening, in response to the indication, create a prospective candidate object to represent the candidate, wherein the prospective candidate object is associated with the at least one job opening, and monitor the prospective candidate object for progress made by the candidate in applying for the at least one job opening.

In accordance with yet another aspect, an apparatus comprising at least one processor and at least one memory including computer program code is provided. In one embodiment, the at least one memory and the computer program code may be configured to, with the processor, cause the apparatus to detect candidate activity, perform a query to determine at least one job opening associated with a desired level of competency that is satisfied by a level of competency associated with the candidate, transmit a message comprising the at least one job opening to the candidate, receive an indication that the candidate reviewed the at least one job opening, in response to the indication, create a prospective candidate object to represent the candidate, wherein the prospective candidate object is associated with the at least one job opening, and monitor the prospective candidate object for progress made by the candidate in applying for the at least one job opening.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
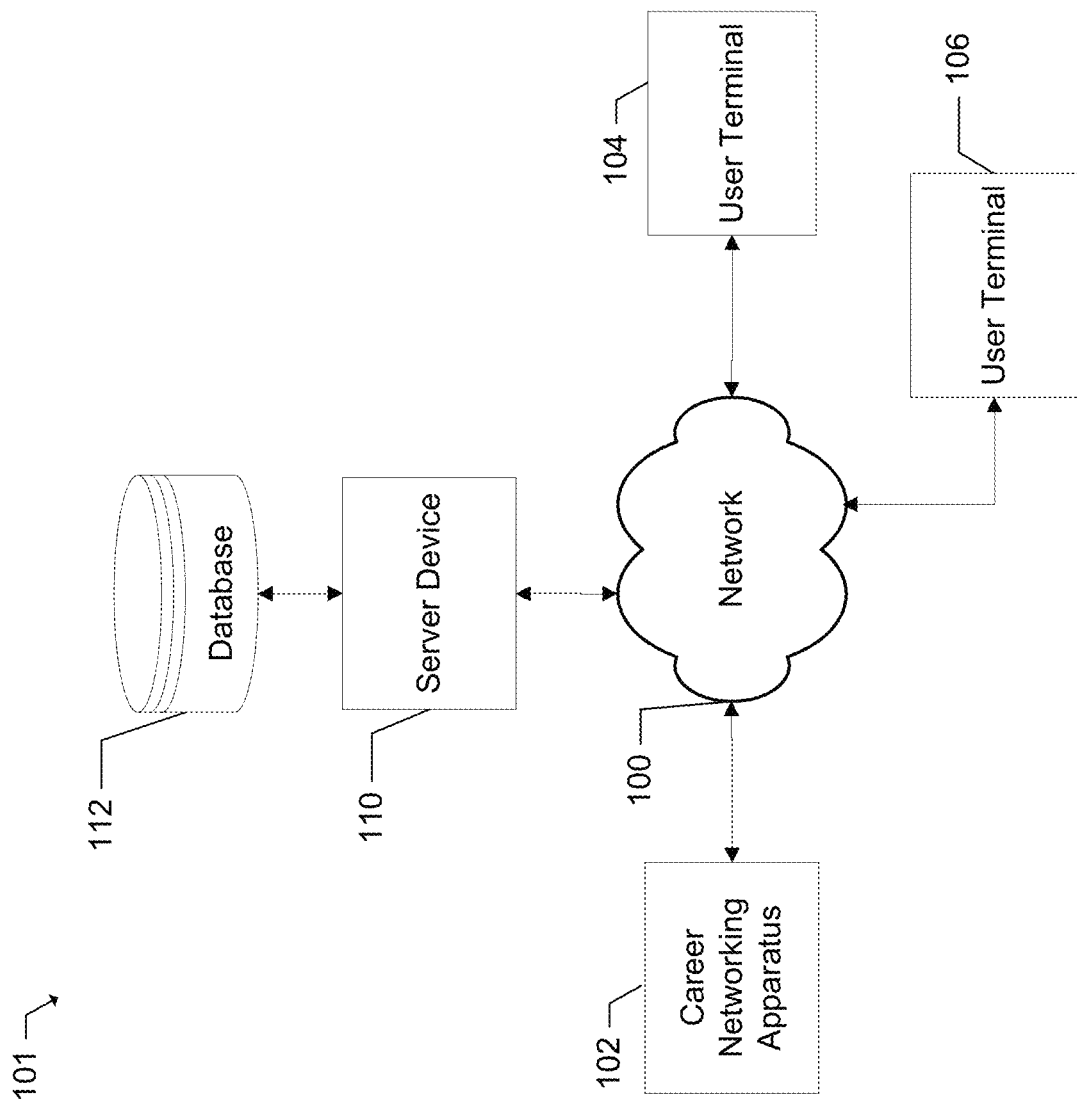
Figure 2:
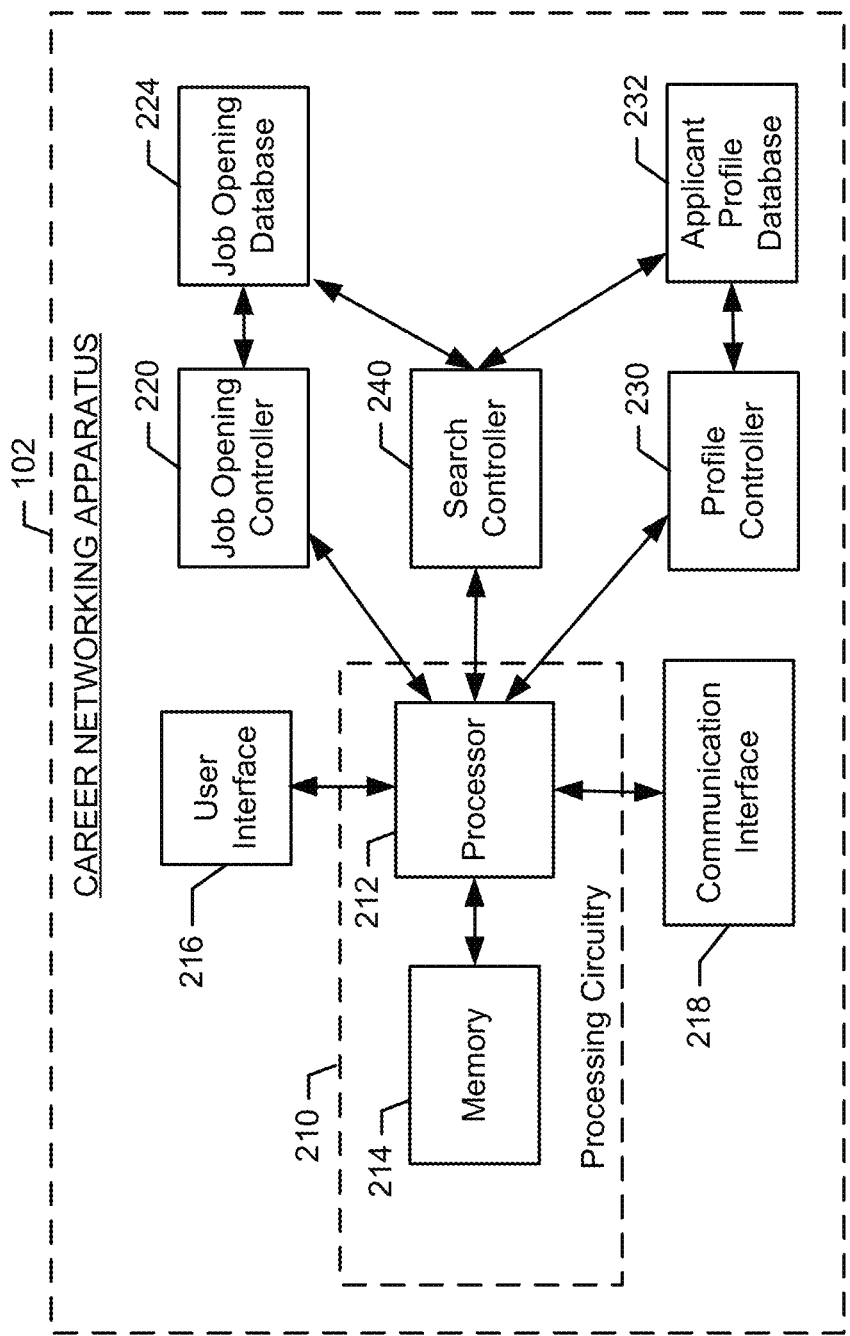
Figure 4:
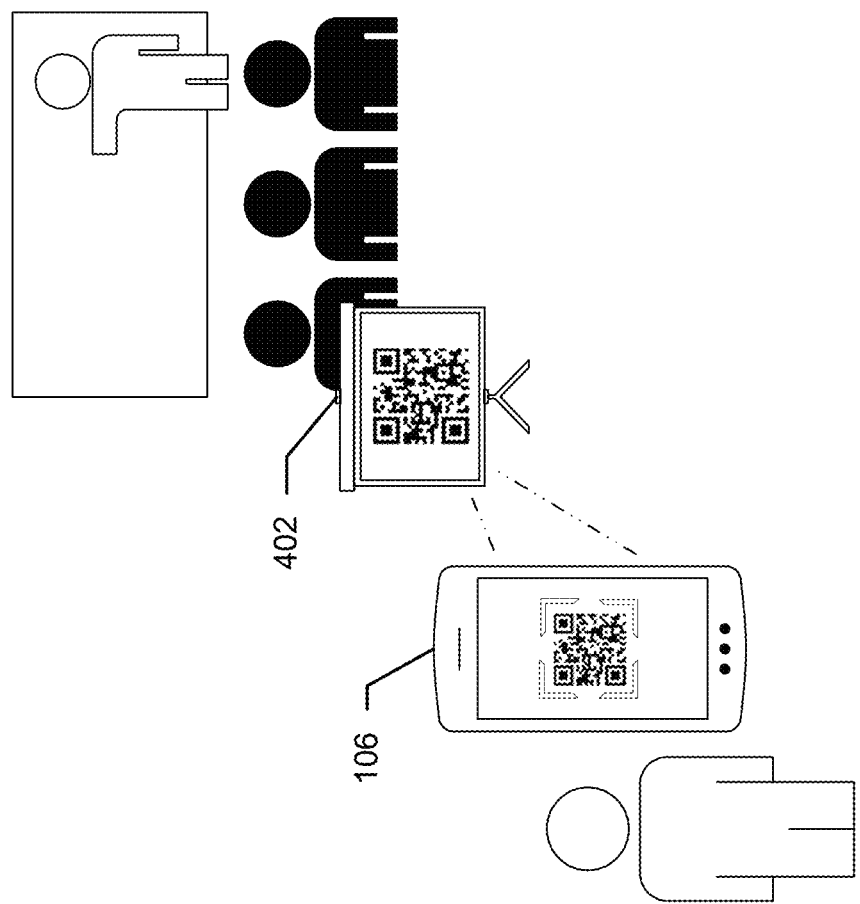
Figure 6B:
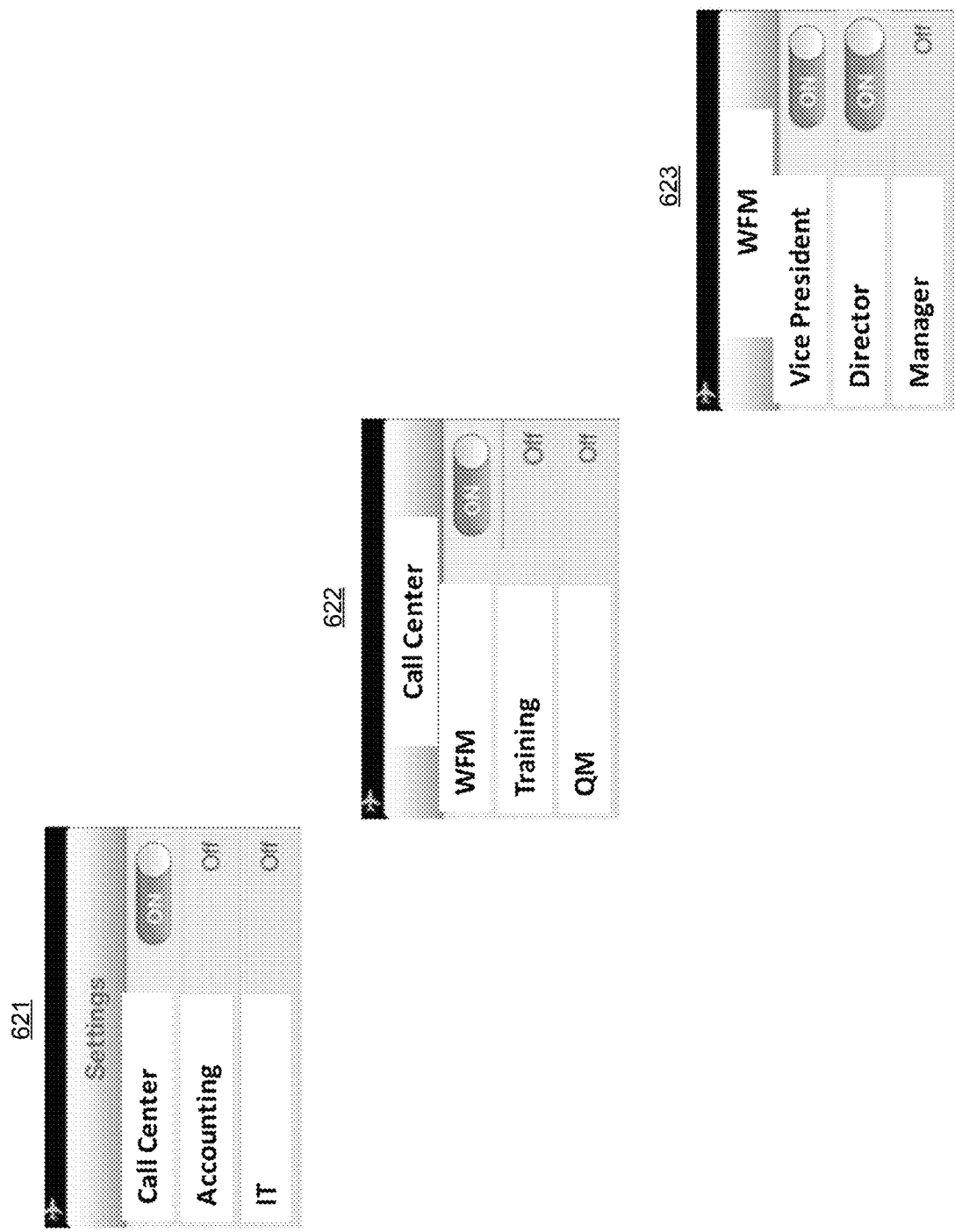
Figure 7:
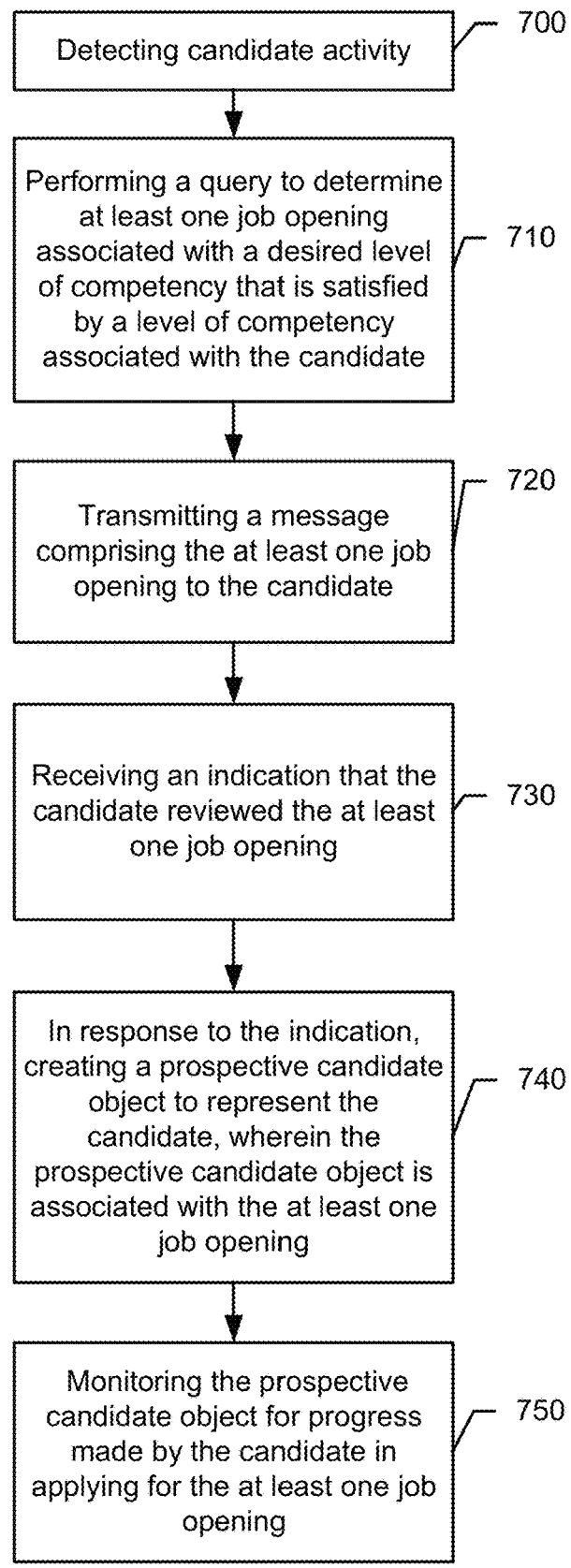
Figure 8:
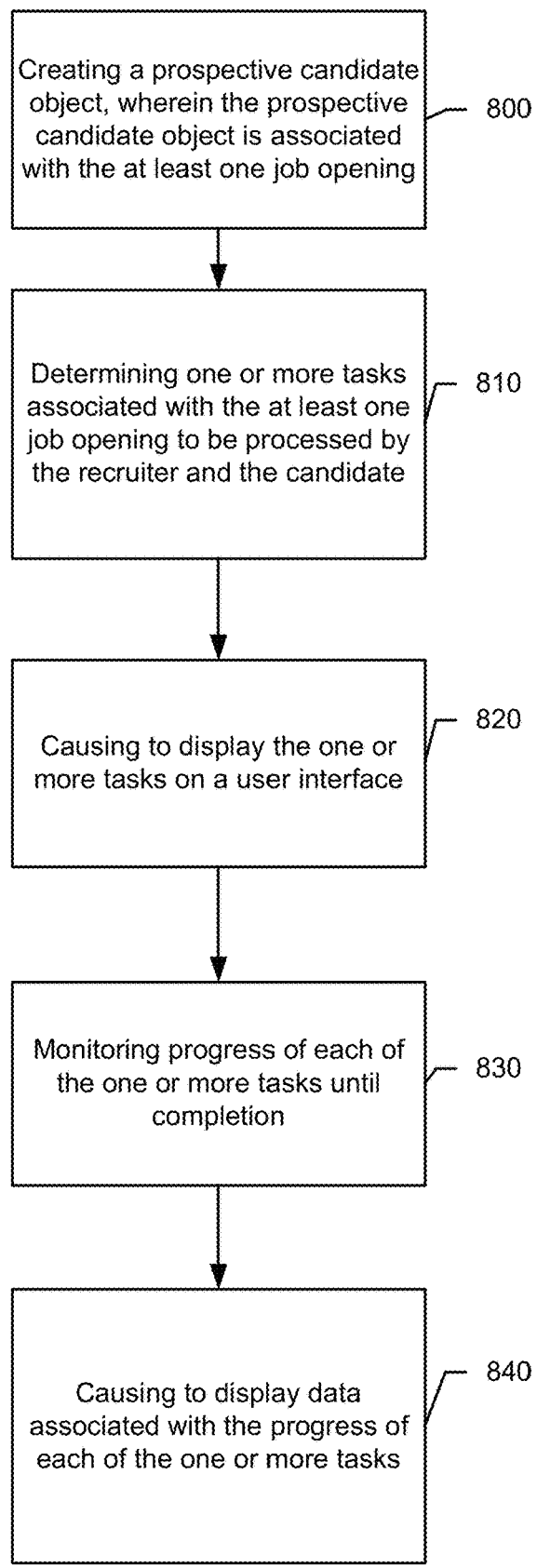
Figure 9:
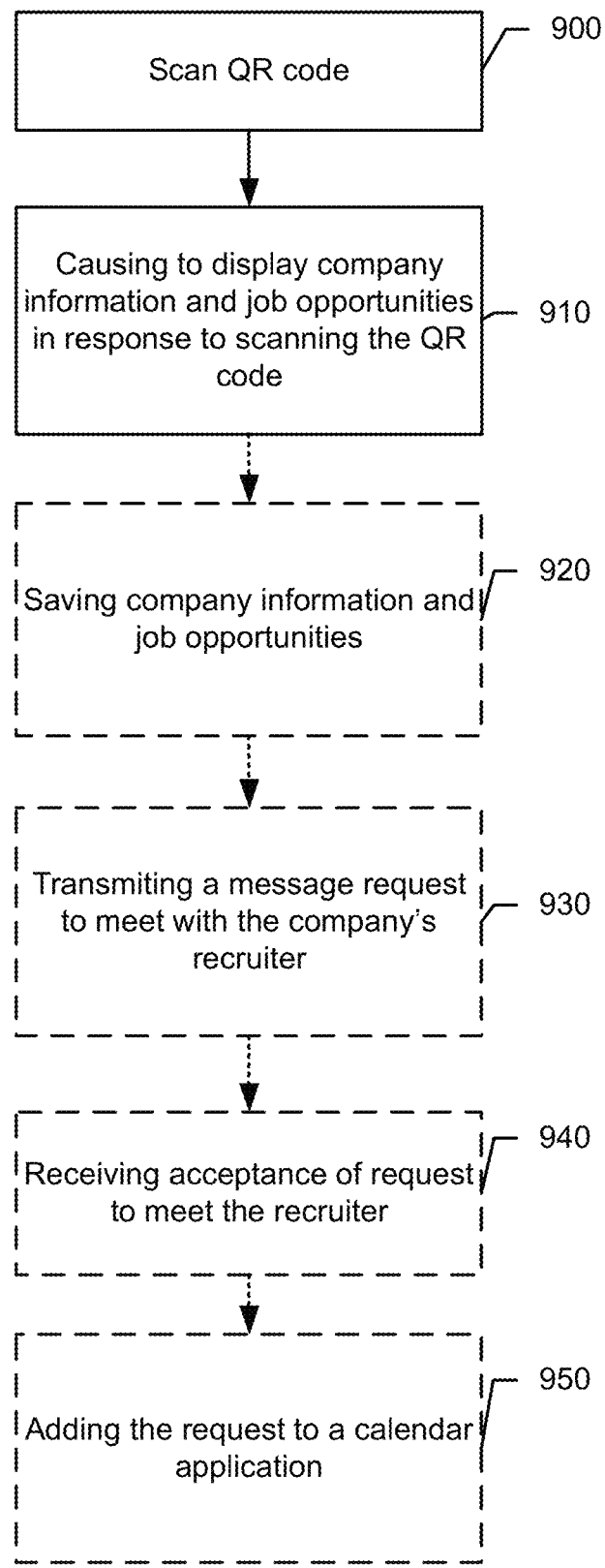

Having thus described embodiments of the invention in general terms, reference will now be made to the accompanying drawings, which are not necessarily drawn to scale, and wherein:

FIG. 1 illustrates a system for online career networking according to some example embodiments described herein;

FIG. 2. illustrates a block diagram of a career networking apparatus in accordance with some example embodiments described herein;

FIG. 3 is a schematic representation of a user interface that may be displayed in accordance with example embodiments of the present invention;

FIG. 4 illustrates an example in which a candidate extracts company data from information scanned from a QR code;

FIGS. 5, 6*a* and 6*b* are schematic representations of user interfaces that may be displayed in accordance with example embodiments of the present invention;

FIG. 7 is a flowchart illustrating an example method for detecting candidate activity and determining a suitable job opening to send to the candidate, according to some example embodiments described herein;

FIG. 8 is a flowchart illustrating an example method for creating a prospective candidate object, associating the prospective candidate object to a set of tasks that are associated with a job opening, and monitoring progress of the set of tasks, according to some example embodiments described herein; and FIG. 9 is a flowchart illustrating an example method for gathering company information from a QR code and initiating a meetup with the company's recruiter, according to some example embodiments described herein; and FIGS. 10-20 are schematic representations of a user interface that may be displayed in accordance with example embodiments of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including but not limited to a non-transitory computer-readable storage medium (e.g., non-volatile media, volatile media) and transmission media. Transmission media include, for example, coaxial cables, copper wire, fiber optic cables, and carrier waves that travel through space without wires or cables, such as acoustic waves and electromagnetic waves, including radio, optical, and infrared waves. Signals include man-made transient variations in amplitude, frequency, phase, polarization or other physical properties transmitted through the transmission media. Examples of non-transitory computer-readable storage media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As used herein, where a computing device is described herein to receive data from another computing device, it will be appreciated that the data may be received directly from the another computing device and/or may be received indirectly via one or more intermediary computing devices, such as, for example, one or more servers, relays, routers, network access points, and/or the like. Similarly, where a computing device is described herein to send data to another computing device, it will be appreciated that the data may be sent directly to the other computing device or may be sent to another computing device via one or more interlinking computing devices, such as, for example, one or more servers, relays, routers, network access points, and/or the like.

Additionally, as used herein, although the figures and examples may refer to users such as recruiters and applicants, other types of users are contemplated (e.g., executives, employers, educators, employees, entrepreneurs, contractors, consultants, etc.). Indeed, example embodiments of the present invention may be used with any type of user.

FIG. 1 illustrates a system 101 for career fair connect according to some example embodiments. It will be appreciated that the system 101 as well as the illustrations in other figures are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for career fair connect, numerous other configurations may also be used to implement embodiments of the present invention.

The system 101 may include a career networking apparatus 102 that may be configured to provide career networking functionality to any number of user terminals 104, 106, which may, for example, be embodied as a laptop computer, tablet computer, mobile phone, desktop computer, workstation, or other like computing device. In some embodiments, a user terminal 104 may be remote from the career networking apparatus 102, in which case the user terminal 104 may communicate with career networking apparatus 102 remotely, such as via network 100. Additionally or alternatively, the user terminal 104 may be implemented on the career networking apparatus 102 or may be directly connected to career networking apparatus 102.

Career networking apparatus 102 may be configured to communicate with user terminal 104 via any of a variety of methods dependent upon the configuration of the system 101. For example, in embodiments in which a career networking apparatus 102 is disposed remotely from the user terminal 104, communication via the network 100 may occur by a variety of connections. The network 100 may be embodied in a local area network, the Internet, any other form of a network, or in any combination thereof, including proprietary private and semi-private networks and public networks. The network 100 may comprise a wireline network, wireless network (e.g., a cellular network, wireless local area network, a wireless wide area network, some combination thereof, or the like), or a combination thereof, and in some example embodiments comprises at least a portion of the Internet.

In some example embodiments, the career networking apparatus 102 may be embodied as or comprise one or more computing devices, such as, by way of non-limiting example, one or more servers configured to access the network 100. In some example embodiments, the career networking apparatus 102 may be implemented as a distributed system or a cloud-based entity that may be implemented within the network 100. In this regard, the career networking apparatus 102 may comprise one or more servers, a server cluster, one or more network nodes, a cloud computing infrastructure, some combination thereof, or the like.

As shown in FIG. 1, user terminal 104, user terminal 106 may communicate with one another via network 100. Network 100 may be a wireless network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network, Wi-Fi, or other type of network. The user terminal 104 may also establish with user terminal 106, a short range wireless communications link 108. Examples include a near field communication (NFC) link, Bluetooth low energy ("BTLE") link or a neighborhood awareness networking ("NAN") specified link. Also, a Wi-Fi communications link can be used. One of the features of the career fair connect system is the ability to determine when one user terminal is within proximity of another user terminal. For example, the user terminals are equipped with global positioning system (GPS) modules that may provide precise location and position data. The user terminals can transmit data to the career fair connect system and the server device 110 can determine whether a user terminal 104 is within the same location of user terminal 106. There are various other location detection mechanisms such as, for example, sound identification through ultrasonic and/or sound pattern recognition, magnetic field detection, radio frequency signal detection, bar/QR code recognition, MAC address recognition, manual data entry, beacons or sensors, and/or other methods. When one user terminal 104 detects the close presence of user terminal 106, both and/or one of the user terminals may want to establish a request for more information so as to determine if there are any job openings provided by user terminal 104 for which user terminal 106 may be eligible. This information may be provided by database 112, which may be hosted on server device 110 (as shown in FIG. 1).

Contained within database 112 is user account information (e.g., username, identifier, or handle information) associated with individuals who have registered to use user terminal devices described herein, relevant network address information for the devices contemplated herein, and metadata relating to both the user accounts and to the devices. This metadata may contain network capability information (e.g., types of networks that may be utilized to establish a connection with particular devices), employer information, available job positions and requirements, applicant profiles and resumes, recruiter information and contact, interviewing scheduling information, other user defined criteria, and/or security information (e.g., login credential information associated with particular user accounts and/or devices). The metadata may further specify modes of communications available and/or preferred by particular devices, which may include text communication or any combination of voice, audio, video, or text.

Because database 112 stores detailed information associated with the individuals and devices that may be connected via network 100, when a recruiter of user terminal 104 detects the close proximity of a candidate of user terminal 106 such as in the case where the candidate may be casually walking through the career fair, the user terminal 104 may initiate a request to query database 112 for the candidate's available information such as name, major, graduation year, and career aspirations, and possibly other related information associated with the candidate or the user terminal 106 associated with the candidate. The query may also include available job openings that the recruiter's company is offering. Suitable job openings may be provided directly to the user terminal 106 associated with the candidate by transmitting a notification of the job opening. In other words, by storing descriptive information regarding the individuals and devices that may be connected in a recruiting environment such as in a career fair or large conference, the database 112 may in many embodiments comprise a central hub facilitating engagement between recruiters and candidates.

FIG. 2 illustrates a career networking apparatus 102 in further detail, in accordance with some example embodiments. However, it should be noted that the components, devices, and elements illustrated in and described with respect to FIG. 2 may not be mandatory and, thus, one or more of the components, devices, or elements illustrated may be omitted in certain embodiments. Additionally, some embodiments may include further or different components, devices, or elements beyond those illustrated in and described with respect to FIG. 2.

Continuing with FIG. 2, processing circuitry 210 may be provided that is configured to perform actions in accordance with one or more example embodiments disclosed herein. In this regard, the processing circuitry 210 may be configured to perform and/or control performance of one or more functionalities of the career networking apparatus 102 in accordance with various example embodiments. The processing circuitry 210 may be configured to perform data processing, application execution, and/or other processing and management services according to one or more example embodiments. In some embodiments, the career networking apparatus 102 or a portion(s) or component(s) thereof, such as the processing circuitry 210, may be embodied as or comprise a circuit chip. The circuit chip may be configured to perform one or more operations for providing the functionalities described herein.

In some example embodiments, the processing circuitry 210 may include a processor 212 and, in some embodiments such as that illustrated in FIG. 2, may further include memory 214. The processing circuitry 210 may be in communication with or otherwise control any number of components or controllers configured to perform various operations consistent with some embodiments of the present invention. For example, with reference to FIG. 2, the processing circuitry 210 may be in communication with or otherwise control (e.g., via the processor 212) a user interface 216, a job opening controller 220, profile controller 230, search controller 240, and/or a communication interface 218. In some embodiments, the processing circuitry 210 may be embodied as a circuit chip (e.g., an integrated circuit chip) configured (e.g., with hardware, software, or a combination of hardware and software) to perform operations described herein. Along these lines, though the illustrated example embodiment of FIG. 2 details a number of different controllers and/or components in communication with or otherwise controlled by the processing circuitry 210, in some embodiments the processing circuitry 210 may be configured to directly control any operation described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of the career networking apparatus 102 as described herein. The plurality of processors may be embodied on a single computing device or distributed across a plurality of computing devices collectively configured to function as the career networking apparatus 102. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry in the form of processing circuitry 210) capable of performing operations according to embodiments of the present invention while configured accordingly. Thus, for example, when the processor 212 is embodied as an ASIC, FPGA, or the like, the processor 212 may comprise hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices collectively configured to function as the career networking apparatus 102. The memory 214 may be configured to store information, data, applications, instructions and/or the like for enabling the career networking apparatus 102 to carry out various functions in accordance with one or more example embodiments. For example, the memory 214 may be configured to buffer input data for processing by the processor 212. Additionally or alternatively, the memory 214 may be configured to store instructions for execution by the processor 212. As yet another alternative, the memory 214 may include one or more databases that may store a variety of files, contents, or data sets. Among the contents of the memory 214, applications may be stored for execution by the processor 212 to carry out the functionality associated with each respective application. In some cases, the memory 214 may be in communication with one or more of the processor 212, user interface 216, communication interface 218, job opening controller 220, profile controller 230, and search controller 240 for passing information among components of career networking apparatus 102.

The user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a joystick, a display, a touch screen display, a microphone, a speaker, and/or other input/output mechanisms. As such, the user interface 216 may, in some example embodiments, provide means for user control of career networking operations and/or the like. In some example embodiments in which the career networking apparatus 102 is embodied as a server, cloud computing system, or the like, aspects of the user interface 216 may be limited or the user interface 216 may not be present. In some example embodiments, one or more aspects of the user interface 216 may be implemented on a user terminal 110. Accordingly, regardless of implementation, the user interface 216 may provide input and output means to facilitate career networking in accordance with one or more example embodiments.

The communication interface 218 may include one or more interface mechanisms for enabling communication with other devices and/or networks. In some cases, the communication interface 218 may be any means such as a device or circuitry embodied in either hardware or a combination of hardware and software that is configured to receive and/or transmit data from/to a network and/or any other device or module in communication with the processing circuitry 210. By way of example, the communication interface 218 may be configured to enable the career networking apparatus 102 to communicate with the user terminal 110 via the network 100. Accordingly, the communication interface 218 may, for example, include supporting hardware and/or software for enabling communications via cable, digital subscriber line (DSL), universal serial bus (USB), Ethernet, or other methods.

In some example embodiments, the processor 212 (or the processing circuitry 210) may be embodied as, include, or otherwise control a job opening controller 220, profile controller 230, and/or search controller 240. As such, the job opening controller 220, profile controller 230, and/or search controller 240 may be embodied as various means, such as circuitry, hardware, a computer program product comprising computer readable program instructions stored on a computer readable medium (for example, the memory 214) and executed by a processing device (for example, the processor 212), or some combination thereof. The job opening controller 220, profile controller 230, and/or search controller 240 may be implemented on separate apparatuses, the same apparatus, or any combination of apparatuses. The job opening controller 220, profile controller 230, and/or search controller 240 may be capable of communication with one or more of the processor 212, memory 214, user interface 216, and communication interface 218 to access, receive, and/or send data as may be needed to perform one or more of the functionalities described herein.

The career networking apparatus 102 may comprise a job opening database 224, and/or an applicant profile database 232. Additionally or alternatively, data described herein as being stored on the job open database 224 and/or the applicant profile database 232 may be stored on the memory 214. The job opening controller 220 may communicate with the job opening database 224 to maintain job opening details. The profile controller 230 may communicate with the applicant profile database 232 to maintain profile related data. The search controller 240 may query the job opening database 224 and/or the applicant profile database 232 to enable career networking and/or searching functionalities described herein. In some example embodiments, such as those in which the career networking apparatus 102 is implemented as a distributed system, the job opening database 224 and/or the applicant profile database 232 may be remote from other components of the career networking apparatus 102 and may be accessed by job opening controller 220 and the profile controller 230, respectively, via the communication interface 218.

Thus, turning now to FIG. 3, a series of operations that may be performed by the user terminal 104 and/or the user terminal 106 will now be described. One primary context in which the following operations may be useful is in a career fair (e.g., where employers, recruiters, and/or schools give information to potential employees). These operations will also be useful after the conclusion of the career fair and during the employment application process. In this regard and as described below, the operations of FIG. 3 may be performed by the user terminal 104 and/or the user terminal 106, such as shown in FIG. 1, which may comprise the career networking apparatus 102, as described in greater detail in FIG. 2. In this regard, the user terminal 104 and/or the user terminal 106 may include means, such as a processor 212, memory 214, communication interface 218, and/or user interface 216 for executing operations described herein. As an initial matter, user terminal 104 and/or the user terminal 106 may present, via user interface 216, an interface soliciting login information. In response, the user terminal 106 may receive a username and password via the user interface 216 and may then transmit this login information, via communication interface 218, to the server device 110. The server device 108 then validates the received username and password, either by delivering an error message to the user terminal 104 and/or the user terminal 106, thus prompting another opportunity to login, or by permitting the user terminal 104 and/or the user terminal 106 to access various operations designed for use by candidates and recruiters. Once the login information has been validated, the database 112 may be updated to indicate that the candidate and/or recruiter is currently utilizing user terminal 104 and/or the user terminal 106. It will be understood that in some embodiments, the login procedure may utilize heightened security measures, such as two-factor authentication, biometric identification, or the like to reduce the likelihood that unauthorized parties can access the functionality described herein. It will further be understood that this login information may in some embodiments be provided once, and that subsequent uses of the user terminal 106 will not require repeated performance of the login procedure.

The specific operations of the user terminal 104 and/or the user terminal 106 will now be described in more detail. It will be understood that upon validation of login information, the user terminal 106 provides a series of possible procedures to the candidate and/or recruiter via a window displaying the Fair Connect Menu Options 301. The operations include, but are not limited to, scanning a QR (quick response) code 302, displaying a career fair map 304, searching for information 306, scheduling interviews or informational sessions with recruiter and candidates 308, monitoring progress of job positions 310, sending/receiving messages 312, and updating the user's profile 314.

The menu option QR scan 302 may support a procedure to facilitate delivery of various types of information to candidates. Barcodes, such as a QR code can store substantial amounts of information in a small footprint. Information such as URL, text, and phone numbers, can be embedded into a barcode. As shown in FIG. 4, in some embodiments, the career networking apparatus 102 may be configured to use a scanner to scan a QR code. As shown in FIG. 4, a sign in front of the employer's booth area may display a QR code 402. This would allow the user terminal 106 to scan the QR code 402 to receive more information about the company and/or any job openings. This would allow a candidate to quickly gather information about the company rather than waste time by standing in line to talk to the recruiter to find out whether the company has any job openings that the candidate is eligible or interested in. To scan a barcode, a candidate can execute a scanner application on the career networking apparatus 102. The candidate points the camera of his or her device at the barcode that is presented on a display or printed on a document. Depending on how the barcode has been formatted, the career networking apparatus can display the embedded text information or automatically connect to a website of the company.

Turning back now to the Fair Connect Menu Options 301, in some embodiments, selection of the career fair map 304 menu option results in display of a map showing the user terminal 104 or user terminal 106's current location. The career fair map may help candidates find specific employers in a career fair setting. The search menu option 306 may allow a candidate or recruiter to search, such as through the search controller 240, the job opening database 224 to locate a job opening and/or locate a specific company at the career fair. The job opening controller 220 and/or search controller 240 may further display information regarding the job openings and/or the companies to the candidate. A recruiter can also use the search option 306 to search for a specific candidate, such as through the search controller 240 and/or the applicant profile database 232, and can view the candidate's information. Additionally or alternatively, the applicant may allow or disallow portions or all of his or her candidate information to be displayed in response to the search. This may be configured via the My Profile menu option 314 described in further detail below.

The My Schedule menu option 308 allows a user, which may be the candidate or the recruiter, to view and track any previous or upcoming scheduled appointments such as informational sessions or interviews. A method of this example embodiment also includes connection to a calendar module of the user's apparatus so that any appointments are also automatically delivered to the user's calendar module. Another method of this example embodiment includes the ability to rate the interview and provide notes. The company or contact in the interview may be ranked as A (Highly Valued), B (Medium), or C (Least Valued) for example without limitation.

The Work Box menu option 310 navigates the user to the My Work Box user interface screens found in FIG. 5 and FIG. 6a disclosed herein. Embodiments of the My Work Box will be described in further detail below. The Messages menu option 312 may present various communication channels to enable a recruiter and a candidate to communicate instantly. The communication channels may include email, instant messaging, video conferencing, and chat. The communication channels for communicating with a user may also provide an indication of whether the user is currently available online for instant communication. Online status may be based on whether the user is connected to the network 100 via the career networking apparatus 102. The online status may include an icon or a description representative of the online presence of the user.

Within the Fair Connect Menu Options 301, the My Profile menu option 314 can be selected, which will take the candidate or the recruiter to a page that is configurable to allow profile modifications such as editing the user's basic information, resume, contact information, website information, social networking profile, etc. The user may also be permitted to change their online status to offline. Recruiters may also update information such as company information, contact information, job postings, etc.

In some embodiments, any communications, search history, search results, QR scans, schedules, My Work box information, profile information may be stored by the user terminal 104 and the user terminal 106. In some embodiments, server device 110 or database 112 may further be designed for longer-term storage of the audio, video, and/or content comprising the career networking apparatus 102, and this data may be uploaded to the server device 110 or database 112 in real-time or in a batch process occurring periodically or when the user terminal 104 or the user terminal 106 detects availability of Wi-Fi connectivity. It will be appreciated that in some embodiments, other information associated with the career networking apparatus 102 can be stored in connection with this data as well. For example, location information of the user terminal 104 or the user terminal 106 may be captured for storage along with the information described above.

In some embodiments the career networking apparatus 102 may be configured to create a Work Box for a recruiter. For example, FIG. 5 illustrates an example display of the recruiter's Work Box 501, which may be termed a "My Work Box." The Work Box 501 may provide for a recruiter a step-by-step workflow that gives the recruiter a proper view by specific job opening. It shows the recruiter where they are in the process of filling a particular job opening and provides a quick view of progress on tasks associated with a candidate's application. An advantage of the Work Box 501 is that it is an all-in-one dashboard incorporating an employer submitting a job offer to a candidate and the candidate accepting or declining the offer. The Work Box 501 may provide an overview of the tasks assigned to a particular candidate's job application and may provide a "big picture" view of the tasks that are expected to be completed by the recruiter. Work Box 501 may include a candidate identifier region. The candidate identifier region may identify the candidate associated with the applied for job number 502 and job position 504. The candidate may be identified by first name 506, last name 508, candidate number 510, and experience level 512. The Work Box 501 further includes a task list region. The task list region may include some or all tasks assigned to or associated with the candidate, job number 502, and/or job position 504. The task list may include an initiate identifier in column 514, which indicates who extended the job offer (i.e., the Company as indicated by the letter "C" or the recruiter as indicated by the letter "R") and an engaged identifier in column 516 representing whether the job application is active, pending, or terminated. Different visual indicators may be provided for the engaged identifier in column 516. For example, in one embodiment, the interface presents the engaged identifier as active with a circle check icon, a "do not enter icon" may represent that the job application is terminated, and a triangle icon may represent that the job application is pending.

In some embodiments, in order for more than one user to view or work on a task at the same time, the application is configured provide one shared instance and may be configured to dynamically change in real-time based on updates made to the data items, and these changes may be shared with each user interface associated with the candidate view and the recruiter view. The application further provides for the shared application instance with consistent display views of the same data in real-time at each user interface and allows for concurrent, real-time collaboration.

The document review column 520 represents whether an important document, for example, the job offer letter, has been reviewed by appropriate persons. The expanded view column 522 with a circle plus icon when selected provides for a detailed pop-up view of the job offer letter overlaid on top of the Work box 501. Alternatively, a full view option can be selected in which the document is shown and adjusted to the full size of the display screen. Other pertinent tasks associated with a candidate's job application are shown in the Work Box 501 such as whether an interview had been conducted, a background check and/or credit check has been completed, whether documents such as a portfolio or the offer letter have been electronically signed, and an indication of whether the candidate has been hired. In some embodiments, when the hired column 521 indicates the candidate has been hired and all the tasks have been completed, the work item moves to the bottom region of the Work Box 501. The recruiter may also manipulate his or her view to hide and show work items associated with hired candidates by selecting the Hide/Show Hired Candidates icon 528. The recruiter may also filter by job level with dropdown 530. Another additional features of Work Box 501 includes the ability to share work items via email communication with another recruiter, for example.

Another example of an additional feature is illustrated in the Work Box 501. In some embodiments, the career networking apparatus 102 may be configured to enable a recruiter to instant message or chat with an available candidate as indicated in the Candidate number 510 column. The availability status as represented by a black circle indicates that the user is available for communication through instant message, chat, or other communication modes. The availability status indicates that the candidate is connected to the network 100 via the career networking apparatus 102. Therefore, the recruiter may communicate with available candidates to provide them with information on the status of their job application, for example. Additionally or alternatively, any recruiter, job information, candidate, and/or work item tasks provided during the employment application process may be saved to the applicant profile database 232 and/or the job opening database 224.

While the above described example embodiment provides a Work Box 501 for a recruiter, in some embodiments, the candidate is presented with a similar workflow as shown in FIG. 6*a*. FIG. 6*a* illustrates an example display for a candidate's Work Box 601. The Work Box 601 may provide for a candidate a step-by-step workflow that gives the candidate a proper view of every job the candidate has applied for. Additionally, Work Box 601 shows the candidate where they are in the process of applying for a particular job opening and provides a quick view of the status of the candidate's applications. Each column displayed in the Work Box 601 provides information on the candidate's application status. Information such as, but not limited to, job number, job position, company 602, recruiter 604, resume 606, interview date 608, application status 610, and job offer 612. The candidate may also filter the listing of applications by status via a dropdown box 620. In addition, the Work Box 601 permits the user to hide or show job offers via a hide/show job offers icon 618. Region 614 of Work Bob 601 houses those applications associated with job offers. In some embodiments, as described above, the career networking apparatus 102 provides for instant communication between the candidate and the recruiters under recruiter column 604.

In some example embodiments, the career networking apparatus 102 may provide for an integrated solution that encompasses the entire hiring process, from identification of qualified candidates for a job opening, through fulfillment of the job opening by hiring the qualified candidate. In some embodiments, the career networking apparatus 102 may be configured to perform a query, such as through the search controller 240, the job opening database 224, and/or the applicant profile database 232, to locate at least one job opening that is satisfied by a candidate's level of competency and present the job opening to the candidate either as a new message via Message menu option 312 and/or a new job object listing on the candidate's Work Box 601. Such a feature enables easier and faster matching of job openings to interested and properly qualified candidates.

In some embodiments the located job opening may be presented via a job file. The job file may comprise detailed information beyond a simple job description. The job file may incorporate specific tools, techniques, templates, samples, video clips, PowerPoint presentations, quizzes, coding challenges, etc., to further describe in detail the job's scope, breadth, and depth. The job file may be moderated and configured by a recruiter or employer.

FIG. 6*b* illustrates parameters particularized for the nature of a candidate alert or a recruiter alert. In some embodiments, candidates can define one or more alert criteria pertaining to one or more desired job positions. Candidates can request to be alerted for job openings matching their criteria. For example, the candidate can request a notification of an alert when a job opening matches one or more candidate settings.

For example, if settings 621 of FIG. 6*b* is selected, the candidate is navigated to a settings page. In the example illustrated, the settings page includes one or more job type Call Center, Accounting, Information Technology (IT), etc. For example, if the candidate selects Call Center, he can be navigated to another selection page 622, which allows him to select the job sub-type for which a notification is to be received. Once, the sub-type work from home (WFM) is selected, the candidate can navigate to another selection page 623 having one or more job positions for which a notification is to be received. In the example illustrated, the candidate may receive a notification of nearby recruiter devices matching a Call Center job type, work from home job sub-type, and vice president or director job positions.

In an example embodiment, the career network apparatus 102 may identify other entities (e.g., user terminals belonging to recruiters) in the vicinity of a candidate's context. The context can be an actual location of the candidate device or a constructive location. The career network apparatus 102 can display recruiter terminals and advertised criteria about the recruiter terminals to the candidate. Using this information, the candidate can target recruiters in which the candidate has an interest or that might be interested in the candidate, or an intersection of both, to connect the candidate to the recruiter. The career network apparatus 102 can use a peer-to-peer-based search, location-based search and/or Bluetooth-based discovery of users within range (e.g., Bluetooth, near field communication (NFC), or other technologies for peer-to-peer or other communications). Advantageously, this example embodiment can include finding the right candidates with a desired skill set at a conference and/or finding employees or employers. A career network apparatus 102 can include a geo-location based search engine to discover surrounding users; a Bluetooth based search engine to discover surrounding users; a filtering engine to filter users; a user profile that includes search criteria to search for other user's interests/strengths/expertise, etc. or advertised parameters of the users' interests/strengths/expertise etc.; one or more such user profiles can exist simultaneously and be active or inactive at the same time; a mechanism to communicate with the discovered users; a mechanism to add the filtered/discovered users to the user's network(s).

Turning to FIG. 7, FIG. 7 is a flowchart illustrating an example method for detecting candidate activity and determining a suitable job opening to send to the candidate. Operation 700 may comprise detecting candidate activity based on the candidate QR code scan described earlier in reference to FIG. 4. Candidate activity may be determined based on the candidate's device in which the device may be configured to detect user motion or other user information associated with the candidate's movement or physical activity. For example, one such detector may be a biometric sensor that senses the candidate's heartbeat, pulse, body temperature, or the like. In another embodiment, a GPS receiver on the candidate's device may determine the candidate's geographic location. The GPS receiver may provide coordinates or other data representative of the candidate's geographic location. Based on the acquired candidate activity as described above, the application may be configured to generate and send presence updates to the recruiter via the recruiter's application, and thus, provide recruiters with a candidate's actual presence status so as to better engage with the candidate.

In some embodiments, the career networking apparatus 102 may be configured to receive an indication that a candidate has scanned a QR code associated with a particular recruiter's informational booth. The indication of candidate activity may also comprise the candidate's identification number. Alternatively or additionally, a candidate may decline sharing their candidate identification number when scanning a QR code. The career networking apparatus 102 is configured to permit the candidate to turn on or off sharing his or her candidate identification number in his or her my profile 314.

In the instance the user permits sharing his or her candidate identification number, the career networking apparatus 102 is configured for performing a query to determine at least one job opening associated with a desired level of competency that is satisfied by a level of competency associated with the candidate as shown in block 710. The query is executed using the candidate's identification number against the job opening database 224 and the applicant profile database 232 in career networking apparatus 102. The query is also executed using dynamic, real-time data gathered from the shared application instance as described herein. Thus, once a job opening has been satisfied, the query results will not include the recently satisfied job opening.

In block 720, the career networking apparatus 102 is configured to transmit a message comprising the at least one job opening to the candidate. The message is sent to the candidate's messages 312. Alternatively or additionally, the candidate may receive an instant notification such as an alert to view the job opening via message 312.

In some embodiments, the career networking apparatus 102 is configured for receiving an indication that the candidate reviewed the at least one job opening as shown in block 730. The indication may be sent to the recruiter's messages 312. Alternatively or additionally, the recruiter may receive an instant notification such as an alert of the indication that the candidate reviewed the job opening.

In response to the indication, the networking apparatus 102 may be configured to create a prospective candidate object to represent the candidate, wherein the prospective candidate object is associated with the at least one job opening as shown in block 740. In some embodiments the career networking apparatus 102 is configured to update the recruiter work box to display the prospective candidate object associated with the at least one job opening.

In block 750, the networking apparatus 102 is configured for monitoring the prospective candidate object for progress made by the candidate in applying for the at least one job opening. Alternatively or additionally, the networking apparatus is configured to update the recruiter work box to display the progress made by the candidate in applying for the at least one job opening.

FIG. 8 is a flowchart illustrating an example method for creating a prospective candidate object, associating the new candidate object to a set of tasks which are associated with a job opening, and monitoring progress of the set of tasks. The candidate object is a data object stored in memory that is updated in real-time based on changes made via the candidate and/or recruiter user interface. The candidate object provides for a shared data object which allows a plurality of users to edit or otherwise work concurrently. The changes may include a record of changes to the object, by whom the change was made, by whom the change was accessed, or other suitable information. The networking apparatus 102 is configured to create the prospective candidate object, wherein the prospective candidate object is associated with at least one job opening. In some embodiments the career networking apparatus 102 is configured to update the recruiter work box to display the prospective candidate object associated with the at least one job opening. Alternatively or additionally, the career networking apparatus 102 is configured to update the candidate work box to display the at least one job opening.

In block 810, the career networking apparatus 102 is configured to determine one or more tasks associated with the at least one job opening to be processed by the recruiter and the candidate. In some embodiments, the career networking apparatus is configured to determine the one or more tasks associated with the at least one job opening based on execution of a query to retrieve one or more tasks associated with the at least one job opening from the job opening database 224.

In some embodiments, the career networking apparatus 102 is configured to cause display of the one or more tasks on the user interface 216 as shown in block 820. In some example embodiments, the one or more tasks are displayed in the recruiter workbox 501 and the candidate workbox 601.

In block 830, the career networking apparatus 102 is configured to monitor progress of each of the one or more tasks until completion. In some example embodiments, the career networking apparatus 102 is configured to track the progress of the one or more tasks to be performed by a number of recruiters, candidates, employers, hiring managers, and/or the like.

In block 840, the career networking apparatus is configured to cause the display of data associated with the progress of each of the one or more tasks. As shown in FIGS. 5 and 6 of the work box graphical user interface display, detail status of the one or more tasks to be performed are displayed. In some embodiments the one or more tasks are associated with icons so as to provide users a quick view of tasks completed, on hold, and/or impeded.

FIG. 9 is a flowchart illustrating an example method for gathering company information from a QR code and initiating a meetup with the company's recruiter. In block 900, the career networking apparatus using a scanner may scan a QR code. In response to scanning the QR code, the career networking apparatus may cause the display of company information and job opportunities as shown in block 910. In some embodiments, the company ID may be embedded in the QR code that is used in querying the job opening database 224. In yet another example embodiment the displayed job opportunities may be suitable for the candidate based on a combined query of the job opening database 224 and the applicant profile database 232.

Alternatively or additionally, the career networking apparatus may save the company information embedded in the QR code (block 920). In another embodiment, the career networking apparatus 102 may transmit a request to meet with the company's recruiter (block 930). The request may be sent to the messages 312 of the career networking apparatus.

In some embodiments, the career networking apparatus 102 is configured to receive acceptance of the request to meet the recruiter (block 940). Alternatively or additionally, the career networking apparatus 102 may add the request to a calendar application of the user terminal as depicted in block 950. In some embodiments, the request may be added to my schedule 308 of the career networking apparatus.

Each of FIGS. 7, 8, and 9 illustrates a flowchart of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, the memory 214) storing instructions executable by a processor in the computing device (for example, by the processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, a career networking apparatus 102 and/or other apparatus) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, a career networking apparatus 102 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, the candidate may be presented with Job Results as shown in FIG. 10. FIG. 10 illustrates an example display for a candidate's Job Results. The Job Results may provide for a candidate a quick view of a plurality of open job offerings based on a search query. In some embodiments, the plurality of open job offerings are structured for display so that the candidate can quickly view open job offerings based on expertise level and salary range. The candidate may also filter the plurality of open job offerings based on candidate status (e.g., active, passive, and inactive). In some embodiments, the candidate may also filter the plurality of open job offerings based on job area (e.g., customer service, sales, training).

As shown in FIG. 11, upon the candidate selecting a particular job offering, the system may display a job description associated with the selected job offering. Job description information displayed may include, but is not limited to: job key terminologies, overall duty and job functions, people skills preferred for the job, development grown as a result of the job, desired start data, job ID, job posting date, and last date in which the job posting was modified by the hiring team.

In some embodiments, the candidate is presented with Experience and Status Level Preferences Tool, as shown in FIG. 12, in which the candidate may be presented with options to select their experience and status level with regards to a particular job area. In the example shown in FIG. 12, the candidate has indicated they are "Qualified" and "Inactive" with regards to job offerings in the area of Customer Service Representative. In this case, the system saves the candidate's experience and status level preferences and will update the job offerings search results accordingly.

In some embodiments, the candidate is presented with the Job Organization Tool as shown in FIG. 13, in which the candidate may be presented with options to select their experience and status level with regards to a particular job area. In Job Organization Tool graphical user interface, the system is configured to display all the Job Titles organized such that each Job Title and its associated Experience and Status selection is presented to the candidate. Further, the Job Organization Tool graphical user interface is configured to display the candidate's resume for each Job Title as well as the room ID. The candidate, via the Job Organization Tool graphical user interface, may select to delete a particular Job Tile and pull a Job Title. In some embodiments, to pull a Job Title includes fetching new matchings for the particular job title. In some embodiments and as shown in FIG. 13, the candidate has indicated they would like to auto apply to certain Job Titles, such as Training Representative, and not auto apply to certain Job Titles, such as Training Supervisor. In some embodiments, the Job Organization Tool graphical user interface may also provide the candidate the ability to view all jobs related to the particular job title.

As shown in FIG. 14, upon the candidate selecting a particular job title, the system may display all the jobs related to the particular job title. Job title information displayed may include, but is not limited to: employer name, industry, company size, age of company, job number, job title, span, reporting information, interest level, and a selection element for applying to a particular job.

Figure 15:

As shown in FIG. 15, upon the candidate selecting a job, the system may display all the specific job information. Job information displayed may include, but is not limited to: compensation information, benefits information, and paid time off information.

Turning now to FIG. 16, the system is configured to provide to a recruiter a Job Offerings Tuning Tool where a recruiter may post different levels of a Job for a recruiter to modify. In an example embodiment, the recruiter may select a number of different jobs to post. In another example embodiment, the Job Offering Tool may provide a recruiter with the ability to select a candidate status (e.g., active, passive, inactive) and, once a candidate status is selected, the system is configured to display all the jobs and job titles associated with the candidate status.

Figure 17:
Figure 18:
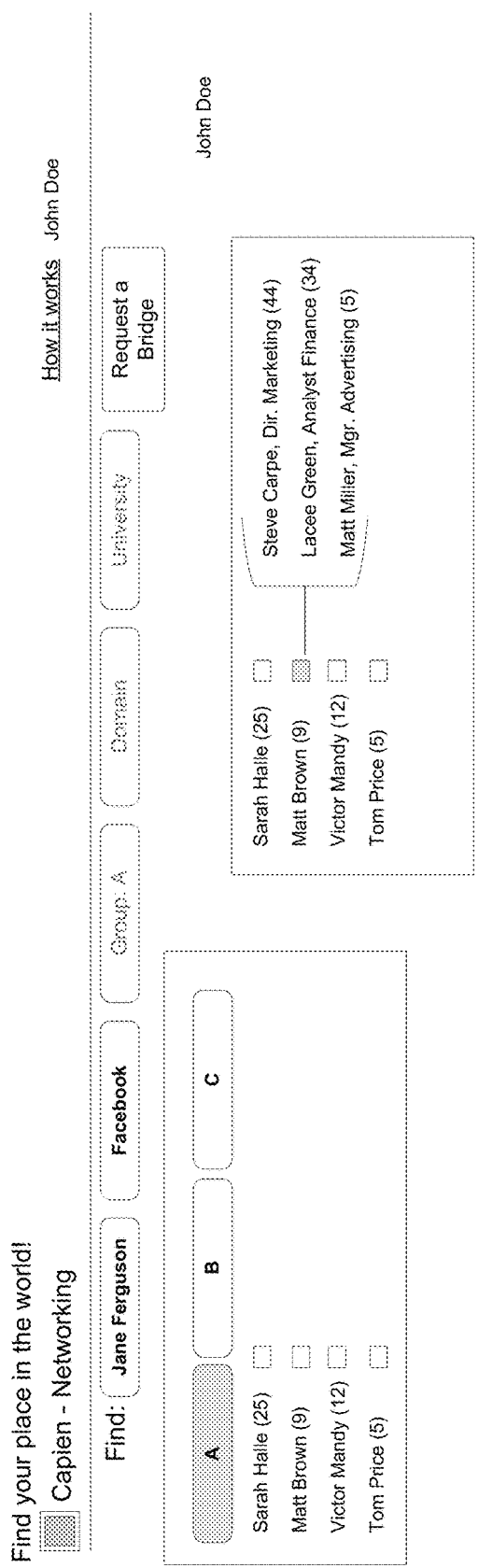
Figure 19:
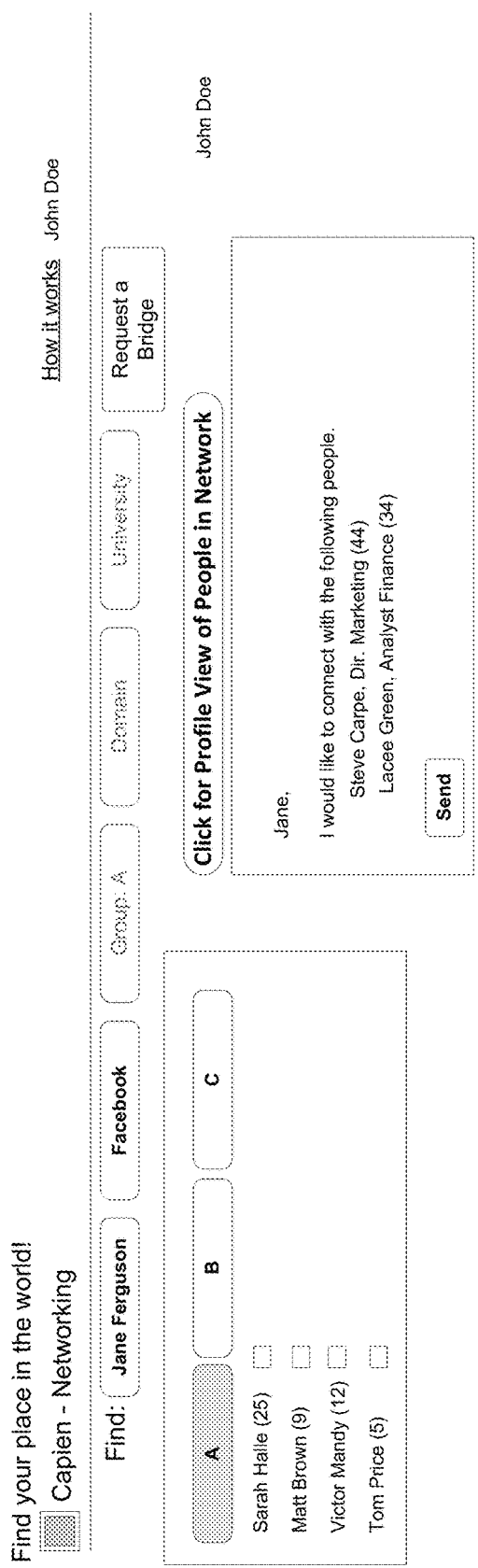
Figure 20:
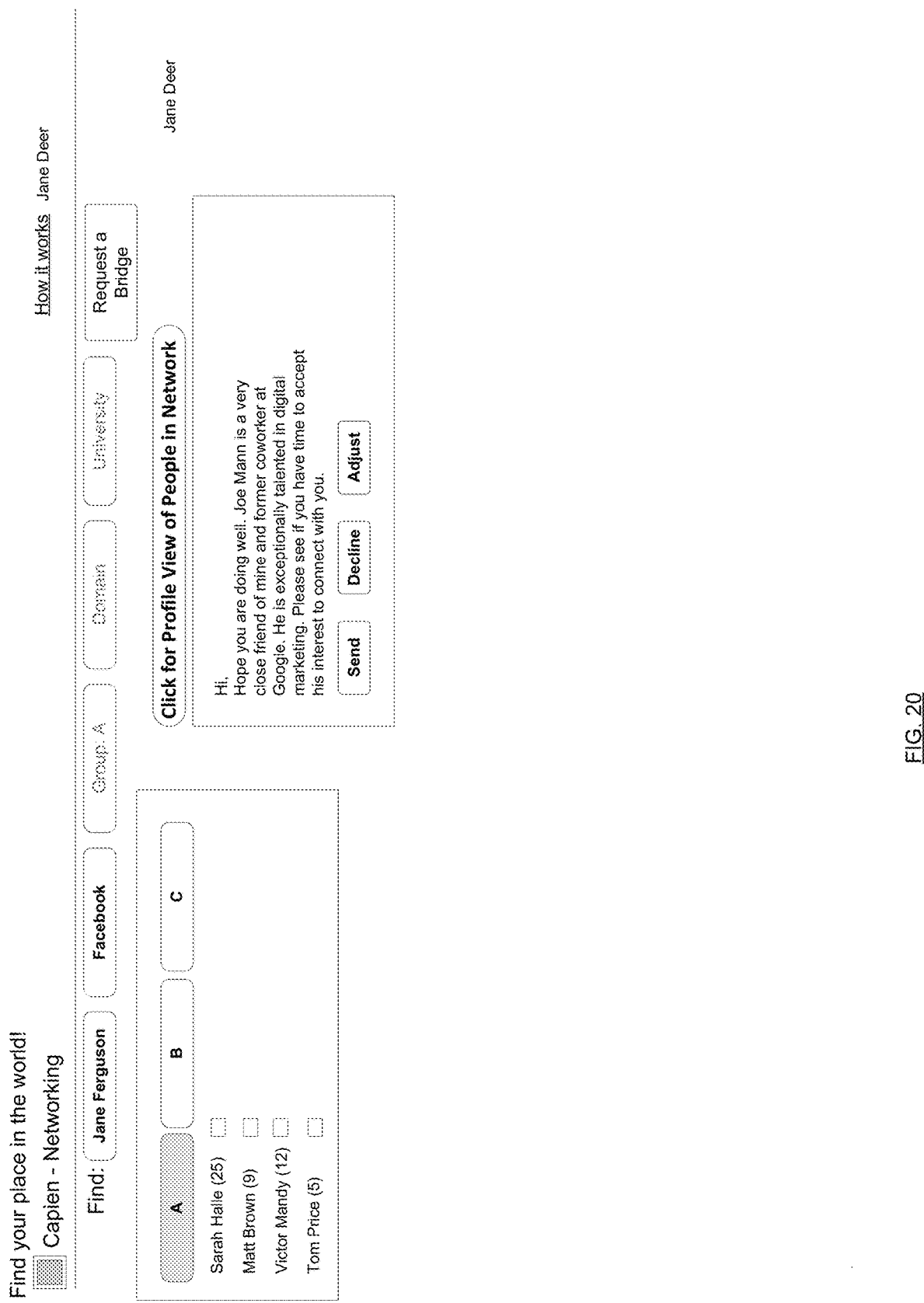

In some embodiments, as shown in FIG. 17, the system is configured to provide a Networking Bridge tool accessible via user interface element 1700. Upon selection of user interface element 1700, the system is configured to display a listing of the candidate's professional contacts. In some embodiments, the candidate may select a particular professional contact and, once a particular professional contact is selected, a listing of the contact's network is displayed for the candidate which, as shown in FIG. 18, may allow the candidate to connect to their contact's network. For example, in FIG. 19, the candidate has opted to connect with two contacts where a request is made to connect. In some embodiments, as depicted in FIG. 19, a selection permitting the candidate to view the profile of any of the contacts is provided. In FIG. 20, the candidate's contact is sent a message comprising a request for the candidate's contact to connect to another of the candidate's selected contact in their network. The solicited contact may have options to send the networking request, decline the networking request, or adjust the networking request. Adjusting the networking request may include selection of a subgroup of contacts, adding contacts, deleting contacts, or suggesting contacts for networking.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    detecting candidate activity, wherein detecting the candidate activity comprises:
        performing a location-based search at a first user terminal of a candidate, wherein the location-based search comprises identifying a second user terminal within a discoverable range of the first user terminal, wherein the discoverable range is at least one of a Bluetooth range or a near-field communication (NFC) range; and
        detecting that the first user terminal of a candidate has scanned a QR code associated with the second user terminal, wherein detecting that the first user terminal has scanned the QR code comprises receiving a candidate identification number associated with the candidate and location-based information obtained from the first user terminal;
    querying a job opening database and an applicant profile database using the candidate identification number to determine at least one job opening associated with a desired level of competency that is satisfied by a level of competency associated with the candidate;
    launching an application, wherein the application is configured to provide a shared instance between a first user interface of the first user terminal and a second user interface of the second user terminal, and wherein the application comprises:
        a job data object associated with the at least one job opening, wherein the job data object comprises a plurality of tasks within the application and at least one of the plurality of tasks comprises uploading a document; and
        a prospective candidate object, wherein the prospective candidate object is generated based on the candidate identification number;
    updating the shared instance of the application in response to determining that a task of the plurality of tasks has been completed; and
    updating a status of the prospective candidate object based on an outcome of the completed task.

2. The method of claim 1, wherein detecting the candidate activity is based on the candidate's movement or physical activity.

3. The method of claim 1 further comprising:
    causing to display company information and job opportunities in response to scanning a barcode;
    saving the company information and job opportunities;
    transmitting a message request to conduct a meeting with a recruiter associated with the company information;
    receiving acceptance of the message request; and
    adding the meeting request to a calendar application.

4. The method of claim 1 further comprising:
    receiving user modifications that modify one or more tasks of the plurality of tasks; and
    storing the user modifications in a database.

5. The method of claim 4, wherein the user modifications comprise change information and access information associated with the plurality of tasks.

6. A computer program product comprising a non-transitory computer readable medium having computer program instructions stored therein, the computer program instructions when executed by a processor, cause the processor to:
    detect candidate activity, wherein detecting the candidate activity comprises:
        performing a location-based search at a first user terminal of a candidate, wherein the location-based search comprises identifying a second user terminal within a discoverable range of the first user terminal, wherein the discoverable range is at least one of a Bluetooth range or a near-field communication (NFC) range; and
        detecting that the first user terminal of a candidate has scanned a QR code associated with the second user terminal, wherein detecting that the first user terminal has scanned the QR code comprises receiving a candidate identification number associated with the candidate and location-based information obtained from the first user terminal;
    query a job opening database and an applicant profile database using the candidate identification number to determine at least one job opening associated with a desired level of competency that is satisfied by a level of competency associated with the candidate;
    launch an application, wherein the application is configured to provide a shared instance between a first user interface of the first user terminal and the second user interface of a second user terminal, and wherein the application comprises:
        a job data object associated with the at least one job opening, wherein the job data object comprises a plurality of tasks within the application and at least one of the plurality of tasks comprises uploading a document; and
        a prospective candidate object, wherein the prospective candidate object is generated based on the candidate identification number;
    update the shared instance of the application in response to determining that a task of the plurality of tasks has been completed; and
    update a status of the prospective candidate object based on an outcome of the completed task.

7. The computer program product of claim 6, wherein the computer program instructions further cause the processor to detect the candidate activity based on the candidate's movement or physical activity.

8. The computer program product of claim 6, wherein the computer program instructions further cause the processor to:
cause to display company information and job opportunities in response to scanning a barcode;
save the company information and job opportunities;
transmit a message request to conduct a meeting with a recruiter associated with the company information;
receive acceptance of the message request; and
add the meeting request to a calendar application.

9. The computer program product of claim 6, wherein the computer program instructions further cause the processor to:
receive user modifications that modify one or more tasks of the plurality of tasks; and
store the user modifications in a database.

10. The computer program product of claim 9, wherein the user modifications comprise change information and access information associated with the plurality of tasks.

11. An apparatus comprising at least one processor and at least one memory including computer program code for one or more programs, the at least one memory and the computer program code configured to, with the at least one processor, cause the apparatus to at least:
detect candidate activity, wherein detecting the candidate activity comprises:
performing a location-based search at a first user terminal of a candidate, wherein the location-based search comprises identifying a second user terminal within a discoverable range of the first user terminal, wherein the discoverable range is at least one of a Bluetooth range or a near-field communication (NFC) range; and
detecting that the first user terminal of a candidate has scanned a QR code associated with the second user terminal, wherein detecting that the first user terminal has scanned the QR code comprises receiving a candidate identification number associated with the candidate and location-based information obtained from the first user terminal;
query a job opening database and an applicant profile database using the candidate identification number to determine at least one job opening associated with a desired level of competency that is satisfied by a level of competency associated with the candidate;
launch an application, wherein the application is configured to provide a shared instance between a first user interface of the first user terminal and the second user interface of a second user terminal, and wherein the application comprises:
a job data object associated with the at least one job opening, wherein the job data object comprises a plurality of tasks within the application and at least one of the plurality of tasks comprises uploading a document; and
a prospective candidate object, wherein the prospective candidate object is generated based on the candidate identification number;
update the shared instance of the application in response to determining that a task of the plurality of tasks has been completed; and
update a status of the prospective candidate object based on an outcome of the completed task.

12. The apparatus of claim 11, wherein the at least one memory and the computer program code are further configured to, with the at least one processor, cause the apparatus to detect the candidate activity based on the candidate's movement or physical activity.

13. The apparatus of claim 11, wherein the at least one memory and the computer program code are further configured to, with the at least one processor, cause the apparatus to perform at least the following:
cause to display company information and job opportunities in response to scanning a barcode;
save the company information and job opportunities;
transmit a message request to conduct a meeting with a recruiter associated with the company information;
receive acceptance of the message request; and
add the meeting request to a calendar application.

14. The apparatus of claim 11, wherein the at least one memory and the computer program code are further configured to, with the at least one processor, cause the apparatus to perform at least the following:
receive user modifications that modify one or more tasks of the plurality of tasks; and
store the user modifications in a database.

15. The apparatus of claim 14, wherein the user modifications comprise change information and access information associated with the plurality of tasks.

16. The method of claim 1, wherein the location-based information is obtained from a GPS receiver of the first user terminal.

17. The computer program product of claim 6, wherein the location-based information is obtained from a GPS receiver of the first user terminal.

18. The apparatus of claim 11, wherein the location-based information is obtained from a GPS receiver of the first user terminal.

* * * * *